(12) United States Patent
Isele et al.

(10) Patent No.: US 10,990,096 B2
(45) Date of Patent: Apr. 27, 2021

(54) REINFORCEMENT LEARNING ON AUTONOMOUS VEHICLES

(71) Applicant: HONDA MOTOR CO., LTD., Tokyo (JP)

(72) Inventors: David Isele, Santa Clara, CA (US); Alireza Nakhaei Sarvedani, Sunnyvale, CA (US); Kikuo Fujimura, Palo Alto, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 83 days.

(21) Appl. No.: 15/965,377

(22) Filed: Apr. 27, 2018

(65) Prior Publication Data

US 2019/0332110 A1 Oct. 31, 2019

(51) Int. Cl.
*G05D 1/00* (2006.01)
*G06N 3/08* (2006.01)

(52) U.S. Cl.
CPC ............ *G05D 1/0088* (2013.01); *G06N 3/08* (2013.01)

(58) Field of Classification Search
CPC .............................. G05D 1/0088; G06N 3/08
See application file for complete search history.

(56) References Cited

U.S. PATENT DOCUMENTS

| | | | |
|---|---|---|---|
| 9,381,916 B1* | 7/2016 | Zhu | B60W 30/0956 |
| 9,977,430 B2* | 5/2018 | Shalev-Shwartz | G05D 1/0221 |
| 10,019,011 B1* | 7/2018 | Green | B60W 30/0956 |
| 10,169,678 B1* | 1/2019 | Sachdeva | G06F 3/04842 |
| 10,216,189 B1* | 2/2019 | Haynes | B60W 30/095 |
| 10,242,665 B1* | 3/2019 | Abeloe | G10L 15/16 |
| 10,254,759 B1* | 4/2019 | Faust | G05B 13/027 |
| 2017/0124476 A1* | 5/2017 | Levinson | G05D 1/0088 |
| 2018/0009445 A1* | 1/2018 | Nishi | B60W 50/06 |
| 2018/0032082 A1* | 2/2018 | Shalev-Shwartz | B60W 30/0953 |
| 2018/0074493 A1* | 3/2018 | Prokhorov | G06N 3/0454 |
| 2018/0089563 A1* | 3/2018 | Redding | G06N 3/08 |
| 2018/0105186 A1* | 4/2018 | Motomura | B60W 50/14 |

(Continued)

OTHER PUBLICATIONS

Kalman, R. E., A new Approach to Linear Filtering and Prediction Problems, 1960, ASME Journal of Basic Engineering, All Pages (Year: 1960).*

(Continued)

*Primary Examiner* — Alan D Hutchinson
*Assistant Examiner* — Andy Schneider
(74) *Attorney, Agent, or Firm* — Arent Fox LLP

(57) ABSTRACT

The present disclosure generally relates to methods and systems for controlling an autonomous vehicle. The vehicle may collect scenario information from one or more sensors mounted on a vehicle. The vehicle may determine a high-level option for a fixed time horizon based on the scenario information. The vehicle may apply a prediction algorithm to the high-level option to mask undesired low-level behaviors for completing the high-level option where a collision is predicted to occur. The vehicle may evaluate a restricted subspace of low-level behaviors using a reinforcement learning system. The vehicle may control the vehicle to perform the high-level option by executing a low-level behavior selected from the restricted subspace. The vehicle may adjust the reinforcement learning system by evaluating a metric of the executed low-level behavior.

13 Claims, 9 Drawing Sheets

(56) References Cited

U.S. PATENT DOCUMENTS

| | | | |
|---|---|---|---|
| 2018/0107215 A1* | 4/2018 | Djuric | G05D 1/0088 |
| 2018/0292824 A1* | 10/2018 | Kazemi | G05D 1/0088 |
| 2018/0292825 A1* | 10/2018 | Smolyanskiy | B62D 15/025 |
| 2019/0005828 A1* | 1/2019 | Costas | G08G 5/0034 |
| 2019/0049970 A1* | 2/2019 | Djuric | G05D 1/0088 |
| 2019/0049982 A1* | 2/2019 | Yang | G05D 1/0221 |
| 2019/0049987 A1* | 2/2019 | Djuric | G05D 1/0246 |
| 2019/0056735 A1* | 2/2019 | Koopman | G05D 1/0088 |
| 2019/0072968 A1* | 3/2019 | Will, IV | G05D 1/0214 |
| 2019/0079481 A1* | 3/2019 | Gluck | G05B 19/048 |
| 2019/0079527 A1* | 3/2019 | Censi | G06N 20/00 |
| 2019/0086924 A1* | 3/2019 | Greenfield | G01C 21/26 |
| 2019/0094884 A1* | 3/2019 | Aitken | G05D 1/0285 |
| 2019/0101649 A1* | 4/2019 | Jensen | G01S 17/89 |
| 2019/0101924 A1* | 4/2019 | Styler | G05D 1/0214 |
| 2019/0102668 A1* | 4/2019 | Yao | G06N 3/04 |
| 2019/0113917 A1* | 4/2019 | Buch | G05D 1/0088 |
| 2019/0113918 A1* | 4/2019 | Englard | G01C 21/3492 |
| 2019/0113929 A1* | 4/2019 | Mukadam | G05D 1/0221 |
| 2019/0122077 A1* | 4/2019 | Tsishkou | G06N 3/0454 |
| 2019/0129432 A1* | 5/2019 | Russell | G05D 1/0214 |
| 2019/0146497 A1* | 5/2019 | Urtasun | G05D 1/0088 |
| 2019/0152490 A1* | 5/2019 | Lan | B60W 50/0097 |
| 2019/0161080 A1* | 5/2019 | Gochev | B60W 30/0956 |
| 2019/0188493 A1* | 6/2019 | Tiziani | G06K 9/00791 |
| 2019/0204834 A1* | 7/2019 | Harrison | G05D 1/0088 |
| 2019/0213290 A1* | 7/2019 | Delva | G06F 17/5009 |
| 2019/0213426 A1* | 7/2019 | Chen | G06K 9/00798 |
| 2019/0220010 A1* | 7/2019 | Leonard | G05D 1/0088 |
| 2019/0220744 A1* | 7/2019 | Yao | G06N 3/08 |

OTHER PUBLICATIONS

Srinivasan, Sharath, The Kalman Filter: An algorithm for making sense of fused sensor insight, Apr. 18, 2018, Towards Data Science, All Pages (Year: 2018).*

A. Carvalho et al., "Stochastic predictive control of autonomous vehicles in uncertain environments," in 12th International Symposium on Advanced Vehicle Control, 2014.

A. Hans et al., "Safe exploration for reinforcement learning," in ESANN, 2008, pp. 143-148.

A. Kuefler et al., "imitating driver behavior with generative adversarial networks," in Intelligent Vehicles Symposium (IV), 2017 IEEE. IEEE, 2017, pp. 204-211.

D. Isele et al., "Navigating occluded intersections with autonomous vehicles, using deep reinforcement learning," IEEE International Conference on Robotics and Automation (ICRA), 2018.

D. Isele et al., "Selective experience replay for lifelong learning," AAAI Conference on Artificial Intelligence (AAAI), 2018.

D. Kraizewicz et al., "Recent development and applications of SUMO-simulation of urban mobility," International Journal on Advances in Systems and Measurements (IARIA), vol. 5, No. 3-4, 2012.

F. Damerow et al., "Risk-aversive behavior planning under multiple situations with uncertainty," in Intellgent Transportation Systems (ITSC), 2015 IEEE 18th international Conference on. IEEE, 2015. pp. 656-668.

G. Agamennoni et al., "Estimation of multivehicle dynamics by considering contextual information," IEEE Transactions on Robotics, vol. 28, No. 4, pp. 855-870, 2012.

G. Aoude et al., "Mobile agent trajectory prediction using bayesian nonparametric reachability trees," Proc. of AIAA Infotech@ Aerospace, pp. 1587-1593, 2011.

J. Garcia et al., "A comprehensive survey on sate reinforcement learning," Journal of Machine Learning Research, vol. 16, No. 1, pp. 1437-1480, 2015.

J. H. Gilluia et al., "Reducing conservativeness in safety guarantees by learning disturbances online: iterated guaranteed safe online learning," Robotics: Science and Systems VIII, p. 81, 2013.

J. Hu et al., "Nash q-learning for general-sum stochastic games," Journal of machine learning research, vol. 4, No. Nov, pp. 1039-1069, 2003.

M. Alshiekh et al., "Safe reinforcement learning via shielding," AAAI Conference on Artificial Intelligence (AAAI), 2018.

M. Bouton et al., "Belief state planning for navigating urban intersections," IEEE Intelligent Vehicles Symposium (IV), 2017.

M. Heger, "Consideration of risk in reinforcement learning," in Machine Learning Proceedings 1994. Elsevier, 1994, pp. 105-111.

M. L. Littman, "Markov games as a framework for multi-agent reinforcement learning," in Machine Learning Proceedings 1994. Elsevier, 1994, pp. 157-163.

M. Treiber et al., "Congested traffic states in empirical observations and microscopic simulations," Physical Review E, vol. 62, No. 2, p. 1805, 2000.

M. Wen et al., "Correct-by-synthesis reinforcement learning with temporal logic constraints," in Intelligent Robots and Systems (IROS), 2015 IEEE/RSJ international Conference on. IEEE, 2015, pp. 4983-4990.

M. Wen et al., "Probably approximately correct learning in stochastic games with temporal logic specifications." in IJCAI, 2016, pp. 3630-3636.

P. Geibel et al., "Risk-sensitive reinforcement learning applied to control under constraints." J. Artif. Intell. Res.(JAIR), vol. 24, pp. 81-108, 2005.

R. A. Howard et al., "Risk-sensitive markov decision processes," Management science, vol. 18, No. 7, pp. 356-369, 1972.

R. Schubert et al., "Comparison and evaluation of advanced motion models for vehicle tracking," in Information Fusion. IEEE, 2008, pp. 1-6.

S. Brechtel et al., "Probabilistic mdp-behavior planning for cars," in intelligent Transportation Systems (ITSC), 2011 14th International IEEE Conference on. IEEE, 2011, pp. 1537-1542.

S. Krauss, "Microscopic modeling of traffic flow: Investigation of collision free vehicle dynamics," Ph.D. dissertation, Deutsches Zentrum fuer Luft-und Raumfahrt, 1998.

S. Lefèvre et al., "A survey on motion prediction and risk assessment for intelligent vehicles," Robornech Journal, vol. 1, No. 1, p. 1, 2014.

S. Lefèvre et al., "Intention-aware risk estimation: Field results," in Advanced Robotics and its Social Impacts (ARSO), 2015 IEEE International Workshop on. IEEE, 2015, pp. 1-8.

S. Shalev-Shwartz et al., "Safe, multi-agent, reinforcement learning for autonomous driving," arXiv preprint arXiv:1610.03295, 2016.

T. Gindele et al., "Learning context sensitive behavior models from observations for predicting traffic situations," in Intelligent Transportation Systems—(ITSC), 2013 16th International IEEE Conference on. IEEE, 2013, pp. 1764-1771.

T. M. Moldovan et al., "Safe exploration in markov decision processes," arXiv preprint arXiv:1205.4810, 2012.

T. Streubel et al., "Prediction of driver intended path at intersections," in Intelligent Vehicles Symposium Proceedings, 2014 IEEE. IEEE, 2014, pp. 134-139.

Song et al., "Intention-aware autonomous driving decision-making in an uncontrolled intersection," Mathematical Problems in Engineering, vol. 2016, 2016.

Z. C. Lipton et al., "Combating reinforcement learning's sisyphean curse with intrinsic fear," arXiv preprint arXiv:1611.01211, 2016.

* cited by examiner

US 10,990,096 B2

REINFORCEMENT LEARNING ON AUTONOMOUS VEHICLES

BACKGROUND

The present disclosure relates to autonomous vehicles, and more particularly, to machine learning for the autonomous vehicles.

An autonomous vehicle may include sensors for detecting an environment of the autonomous vehicle and a processing system configured to control the autonomous vehicle to operate within the environment. Human drivers may be capable of learning from their driving experiences and improving their driving performance. With the increasing complexity of robotic systems and the continued advances in machine learning, it may be tempting to apply reinforcement learning (RL) to challenging control problems such as control of autonomous vehicles. However, the trial and error searches typical to RL methods may not be appropriate for physical systems that operate in the real world where failure cases may result in real consequences. On autonomous vehicle systems deployed in scenarios with other actors (e.g., vehicles and pedestrians), a single failure may be prohibited and learning may be confined to satisfy constraints.

In view of the foregoing, there may be ways to provide constraints while performing reinforcement learning to improve autonomous driving. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the disclosure provides a method of controlling an autonomous vehicle. The method may include collecting scenario information from one or more sensors mounted on a vehicle. The method may include determining a high-level option for a fixed time horizon based on the scenario information. The method may include applying a prediction algorithm to the high-level option to mask undesired low-level behaviors for completing the high-level option where a collision is predicted to occur. The method may include evaluating a restricted subspace of low-level behaviors using a reinforcement learning system. The method may include controlling the vehicle to perform the high-level option by executing a low-level behavior selected from the restricted subspace. The method may include adjusting the reinforcement learning system by evaluating a metric of the executed low-level behavior.

In another aspect, the disclosure provides a vehicle for autonomous driving including a sensor system including one or more sensors mounted on the vehicle that collects scenario information. The vehicle may include a memory storing executable instructions and a processor communicatively coupled to the memory. The processor may be configured to determine a high-level option for a fixed time horizon based on the scenario information. The processor may be configured to determine a high-level option for a fixed time horizon based on the scenario information. The processor may be configured to apply a prediction algorithm to the high-level option to mask undesired low-level behaviors for completing the high-level option where a collision is predicted to occur. The processor may be configured to evaluate a restricted subspace of low-level behaviors using a reinforcement learning system. The processor may be configured to control the vehicle to perform the high-level option by executing a low-level behavior selected from the restricted subspace. The processor may be configured to adjust the reinforcement learning system by evaluating a metric of the executed low-level behavior.

In another aspect, the disclosure provides a non-transitory computer-readable medium including instructions that when executed by a processor cause the processor to collect scenario information from one or more sensors mounted on a vehicle. The non-transitory computer-readable medium may include instructions to determine a high-level option for a fixed time horizon based on the scenario information. The non-transitory computer-readable medium may include instructions to apply a prediction algorithm to the high-level option to mask undesired low-level behaviors for completing the high-level option where a collision is predicted to occur. The non-transitory computer-readable medium may include instructions to evaluate a restricted subspace of low-level behaviors using a reinforcement learning system. The non-transitory computer-readable medium may include instructions to control the vehicle to perform the high-level option by executing a low-level behavior selected from the restricted subspace. The non-transitory computer-readable medium may include instructions to adjust the reinforcement learning system by evaluating a metric of the executed low-level behavior.

These and other aspects of the disclosure will become more fully understood upon a review of the detailed description, which follows.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
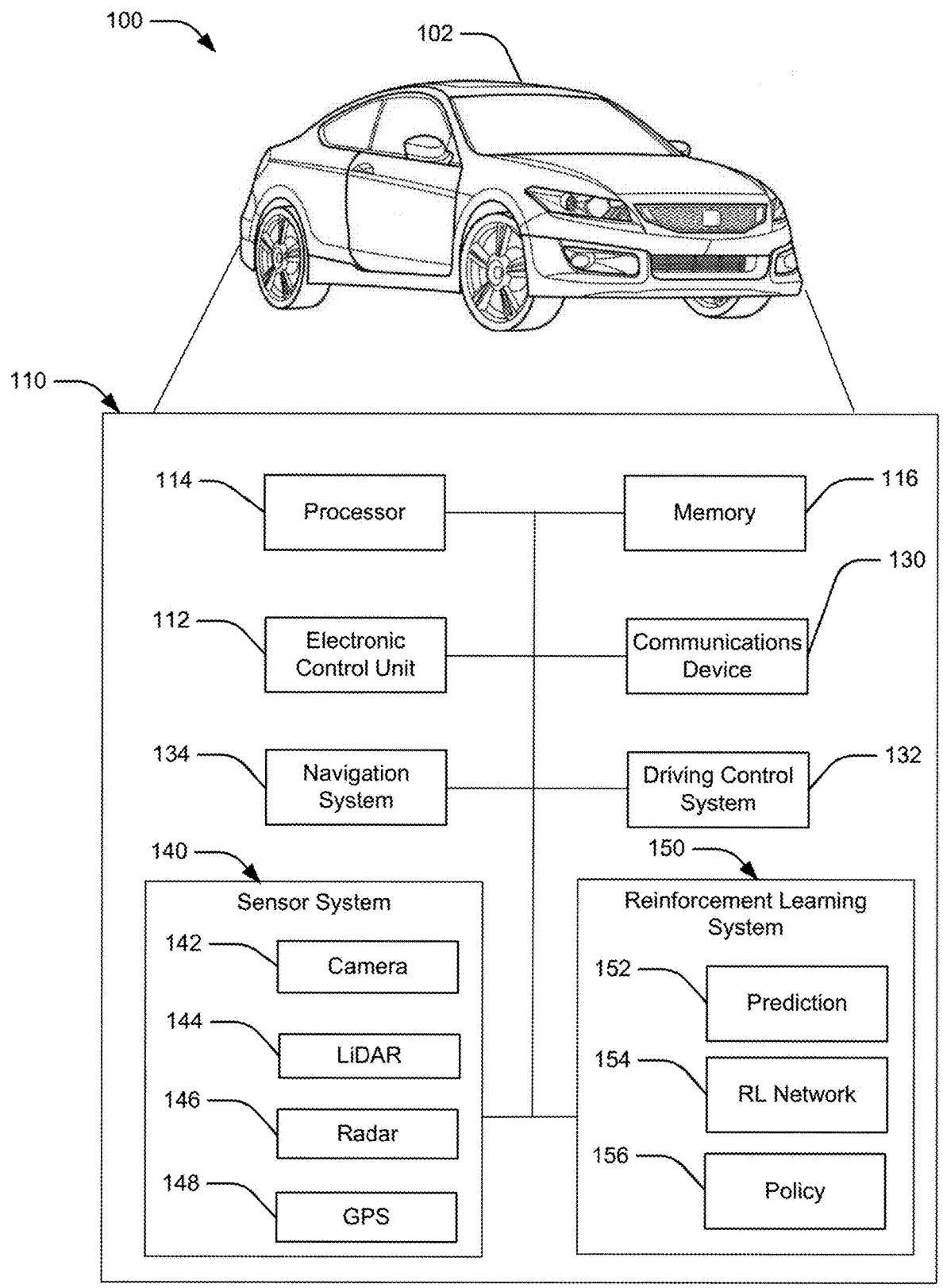
FIG. 1 illustrates a schematic view of an example operating environment of a reinforcement learning system for autonomous driving in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

To mitigate the concerns associated with training an RL agent, there have been various efforts at designing learning processes with constrained exploration. These efforts may be broadly classified into approaches that modify the objective function and approaches that constrain the search space. Modifying the objective function mostly focuses on catastrophic rare events that do not necessarily have a large impact on the expected return over many trials. Proposed methods take into account the variance of return, the worst-outcome, and the probability of visiting error states. Modified objective functions may be useful on robotic systems where a small number of failures are acceptable. However, on critical systems, often a single failure is prohibited and learning may be confined to always satisfy the constraints. Methods that constrain the search space can completely forbid undesirable states and are usually accompanied by formal guarantees. However, satisfying the necessary conditions on physical systems can be quite difficult in practice. For example, strategies have assumed a known default policy that may take over and return to normal operating conditions, a learning model that is restricted to tabular RL methods, and states that may be deterministically perceived and mapped to logical expressions. These approaches tend to be computationally expensive, preventing their application to high dimensional problems such as domains with multiple agents.

The present disclosure uses prediction to achieve a system that scales better to higher dimensions and is more suited to noisy measurements. Using prediction methods, the system may constrain learning to optimize intersection behaviors on an autonomous vehicle where it must account for the behaviors of multiple other agents. While prediction is a very general framework that lends itself to implementations on a variety of stochastic physical systems, constraints based on prediction tend to be weaker than other approaches. For example, predictions may assume that other agents (e.g., traffic vehicles) follow a distribution and are not adversarial. These assumptions, however, may or may not be generally reasonable in an autonomous driving scenario.

Turning to FIG. 1, a schematic view of an example operating environment 100 reinforcement learning system 150 for autonomous driving. The reinforcement learning system 150 may reside within a vehicle 102 along with other components of an autonomous driving system 110 including a processor 114, memory 116, electronic control unit 112, communications device 130, navigation system 134, driving control system 132, and sensor system 140. The components of the autonomous driving system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the autonomous driving system 110 that includes the reinforcement learning system 150, among others, in addition to a sensor system 140, a driving control system 132, vehicle HVAC systems, vehicle audio systems, vehicle video systems, vehicle infotainment systems, vehicle telephone systems, and the like.

The sensor system 140 may include multiple sensors that provide input to the autonomous driving system 110. For example, the sensor system 140 may include one or more of a camera 142 or other image-capturing device (e.g., a scanner), a light detection and ranging (LiDAR) system 144, a radar system 146, and a global positioning system (GPS) 148 or other satellite-based navigation system. The camera 142 may obtain images of a vehicle environment and the sensor system 140 may apply image recognition to perform object detection. The LiDAR system 144 may capture a point cloud by detecting reflected light beams. The sensor system 140 may analyze the point cloud to detect objects. Similarly, the radar system 146 may use reflected radio waves to detect objects. The GPS system 148 may provide a location of the vehicle 102. The sensor system 140 may combine the output of multiple sensors to both locate the vehicle 102 and detect and track other objects. In an aspect, objects capable of moving (e.g., pedestrians and other vehicles) may be referred to as actors. The sensor system 140 may provide the position and movement tracking information for detected actors to the reinforcement learning system 150. In one embodiment used for testing, the sensor system 140 included six LiDAR sensors and three radars. A clustering of LiDAR points with tuned geometric thresholds was combined with output from the radars create estimates for vehicle detection. Each detected vehicle was tracked by a separate particle filter.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the autonomous driving system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

The vehicle 102 may include a driving control system 132 for controlling the vehicle 102. The driving control system 132 may control the vehicle 102 based on a high-level option and low-level behavior selected by the reinforcement learning system 150. The driving control system 132 may include controllers that translate the high-level option and low-level behavior into inputs to different vehicle controls (e.g., steering, acceleration, and braking).

The vehicle 102 may include a navigation system 134 for determining a route of the vehicle 102. In an aspect, the navigation system 134 may determine high-level options for the vehicle 102. For example, the navigation system 134 may determine that the vehicle 102 should make a left turn at an intersection based on the desired destination and current location. The navigation system 134 may employ conventional route planning algorithms to select a route that minimizes distance, travel time, or other factors.

The reinforcement learning system 150 may be a system that determines actions of the vehicle 102 for autonomous driving. The reinforcement learning system 150 may receive a high-level option selected by the navigation system 134. The reinforcement learning system 150 may also receive input from the sensor system 140. The reinforcement learning system 150 may determine a low-level behavior for controlling the vehicle 102. The reinforcement learning system 150 may include a prediction algorithm 152 for determining constraints, a reinforcement learning (RL) network 154 for modeling driving experience, and a policy 156 for selecting a low-level behavior. The reinforcement learning system 150 will be described in further detail below with respect to FIG. 2.

Figure 2:
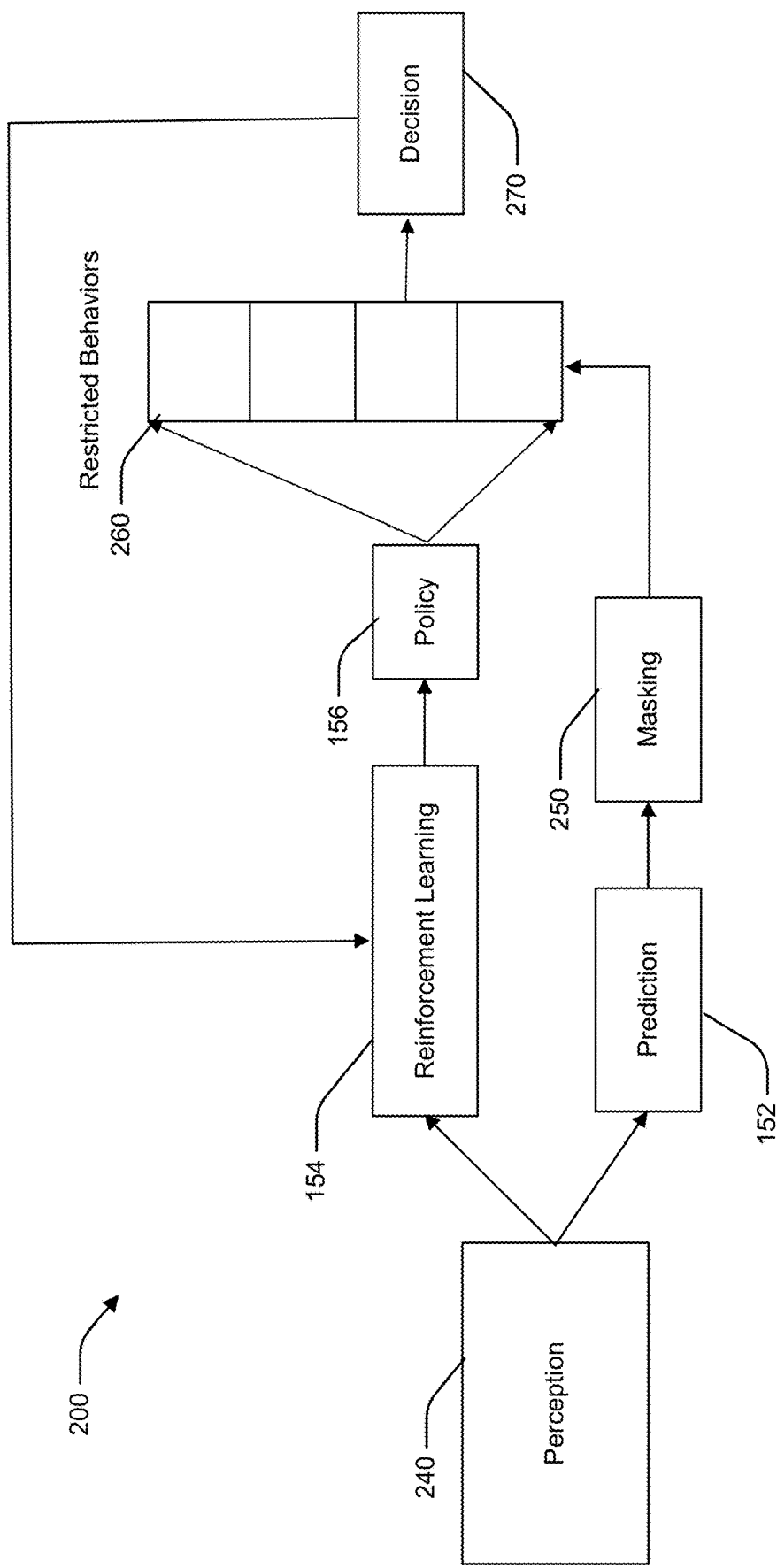
FIG. 2 illustrates a conceptual diagram showing a processing pipeline for the reinforcement learning system in accordance with aspects of the present disclosure.

FIG. 2 illustrates a conceptual diagram showing a processing pipeline 200 for the reinforcement learning system 150 in accordance with aspects of the present disclosure. The processing pipeline 200 may include a perception algorithm 240 for processing input from sensor system 140, the prediction algorithm 152 for determining whether a low-level behavior is likely to result in a collision, a masking algorithm 250 for hiding low-level behaviors that are likely to result in a collision, the RL network 154 for analyzing low-level behaviors, the policy 156 for evaluating potential low-level behaviors, restricted behaviors 260, and decision 270 for performing a low-level behavior.

The perception algorithm 240 may be executed by the processor 114 to perform any processing of input from sensor system 140 to determine a scenario for the vehicle 102. For example, the perception algorithm 240 may perform localization, object identification, and object tracking. In testing one embodiment, radar and lidar were used as inputs to the perception algorithm, however other possible inputs may include camera data and GPS.

The prediction algorithm 152 may analyze the input from the perception block to determine whether a low-level behavior is likely to result in a collision. The prediction algorithm 152 may define a restricted set of policies $\Pi^i$ as the set of policies that generates a trajectory $\tau$ that with probability less than $\delta$ has agent i entering a danger state at any step in its execution. The prediction algorithm 152 may find a policy 156 in a multi-agent setting by modeling the problem as a stochastic game. In a stochastic game, at time t each agent i in state $s_t$ takes an action a't according to the policy $\Pi^i$. All the agents then transition to the state $s_{t+1}$ and receive a reward $r^i_t$. Stochastic games may be described as a tuple (S, A, P, R), where S is the set of states, and $A=\{A^1, \ldots, A^m\}$ is the joint action space consisting of the set of each agent's actions, where m is the number of agents. The reward functions $R=\{R^1, \ldots, R^m\}$ describe the reward for each agent $S \times A \rightarrow R$. The transition function P: $S \times A \times S \rightarrow [0, 1]$ describes how the state evolves in response to all the agents' collective actions. Stochastic games are an extension to Markov Decision Processes (MDPs) that generalize to multiple agents, each of which has its own policy and reward function.

In a model created by the prediction algorithm 152, the variable $x^i_t$ may be used to describe the local state of a single agent. The sequence of the local states (x), actions (a), and rewards (r) for a single agent will be referred to as a trajectory $\tau^i = \{(x^i_1, a^i_1, r^i_1), \ldots, (x^i_T, a^i_T, r^i_T)\}$ over a horizon T. An optimal ego-agent policy $\Pi_{ego}$ should be optimally learned, where at every point in the learning process $\Pi_{ego} \in \Pi^{ego}$. Using a prediction model based on a MDP, the prediction algorithm 152 may not only check that a low-level behavior does not result in a collision, but also check that the low-level behavior does not transition the vehicle 102 into a state where a collision is likely in a next time step, or at another point in the predictable future. In an aspect, such predictions for multiple time steps to avoid collisions may require branching through all possible action combinations for a fixed time horizon T. Brute force implementations would result in an intractable runtime of O ($|A|^T$), where $|A|=|A^1| \times \ldots \times |A^m|$. For this reason, the prediction algorithm 152 may use an efficient approximation for restricting the exploration space.

To reduce the complexity of masking actions that may result in collisions, the prediction algorithm 152 may assume the actions at each time step are components of a high-level action (interchangeably referred to as options in the RL literature, and intentions in the autonomous driving literature). This has the effect of collapsing the branching factor of time associated with the exponential complexity. The cost of this approximation is that, for the fixed horizon, each agent is restricted in its ability to react and interact with other agents. To accommodate the breadth of low-level action sequences that correspond to a single high-level action and also to allow for a bounded level of interaction, the prediction algorithm 152 may make each high-level action a probability distribution over functions f. The trajectory in terms of high-level actions $p(\tau^i) \approx \Sigma_{j=1}^{|h^i|} p_h^{i,j} x_1^i, \ldots, x_T^i)$. The term j indexes the high-level action h. Then the functional local-state update may be described as $x_{t+1} = f^{i,j} x_t + \epsilon$ where the noise $\epsilon$ is modeled as a Gaussian distribution $\epsilon = N(\mu, \sigma)$. This means that the updated local state has a corresponding mean and a variance.

Within the fixed time horizon, each agent may perform a single high-level action. The variance may act as a bound that encompasses the variety of low-level actions that produce similar high-level actions. Additionally, the variance may be used to create bounds that prevent likely collisions. These bounds may allow for a bounded ability of each agent to react to other agents without violating the constraints. This may be comparable to selecting an open-loop high-level decision followed by subsequent bounded closed-loop low-level corrections. By restricting an agent's ability to interact and limiting each agent to a restricted set of high-level actions, the prediction algorithm 152 may ignore the existence of many pathological cases that may arise in an adversarial setting.

Given the assumption of high-level actions that follow a distribution, satisfying constraints may be computed in $O(|H|T)$ where $|H^i|$ is the number of high-level actions available to agent i and $|H|=|H^i|\times \ldots \times |H^m|$. This computation time may still be expensive for problems with a large number of actions or agents, and may not be suitable for autonomous driving scenarios. A further simplifying assumption arises when the prediction algorithm 152 assumes that an agent's action space is unimodal. This is the case when the prediction algorithm 152 assumes the agent has a single action (e.g. a constant velocity assumption) or when a hard prediction of the most probable action may be made. This reduces the time complexity of a forward checking prediction to O(mT), which may be suitable for autonomous driving scenarios.

The prediction algorithm 152 may make probabilistic guarantees (e.g., the likelihood of a collision is less than a threshold). From Chebyshev's inequality, the likelihood of an agent i taking action j and leaving its margins $$k\sigma^{i,j} \text{ is } p[|\tau^{i,j} - E(\tau^{i,j})| \geq k\sigma^{i,j}] \leq \frac{1}{k^2}.$$

Since the prediction algorithm 152 generally is only concerned with one-sided error (e.g., if the traffic car is further away than predicted, the vehicle 102 does not risk a collision) the error may be shrunk by a factor of two:

$$p[|\tau^{i,j} - E(\tau^{i,j})| \geq k\sigma^{i,j}] \leq \frac{1}{2k^2}.$$

In a model used by the prediction algorithm 152, the margins may create an envelope or predicted region for an agent's expected trajectory. Based on sufficient samples of independent trials and selecting appropriate margins, the prediction algorithm 152 may assume the predicted trajectory roughly models the reachable space of the agent. In expectation, the agent follows the mean, but on each trial the deviations are likely not a purely random process, but are biased by a response to other agents. In the autonomous driving literature it is a common assumption that each agent behaves with self-preservation. The prediction algorithm 152 may assume that the measured distribution of the trajectory is the sum of two normally distributed random processes: the first associated with the agent's control and the second a random noise variable. The measured variance of a trajectory $\sigma_M^2$ is the sum of controlled $\sigma_c^2$ and noise $\sigma_n^2$ variances. These may be expressed relative to the measured standard deviation of the trajectory as $\alpha_c \sigma_M$ and $\alpha_n \sigma_M$ where $\alpha_c^2 + \alpha_n^2 = 1$. Assuming an agent controls away from the mean by $\kappa_c \alpha_c \sigma_M < k \sigma_M$, the probability that an agent leaves its margin is $$p[\tau^{i,j} - E(\tau^{i,j}) \geq \kappa_n \alpha_n \sigma_M] \leq \frac{1}{2k^2}, \text{ where } \kappa_n = \frac{k + \kappa_c \alpha_c}{\alpha_n}.$$

To put this in concrete terms for an autonomous driving scenario, if the prediction algorithm 152 assumes a 5 m measured standard deviation, 4 m control standard deviation, 3 m noise standard deviation, margin of 3 $\sigma_M$, and control action of $2\sigma_c$, the resulting margin is $7.6\sigma_n$. This analysis does not take into account any corrective controls of the ego agent. Applying the union bound and assuming a fixed $\kappa_n$ for notational clarity, the prediction algorithm 152 may achieve a desired confidence $\delta$ by satisfying $$\frac{m}{2\kappa_n^2} < \delta.$$

In one embodiment of the prediction algorithm 152 for handling an intersection, traffic vehicles may be modeled using a constant velocity assumption based on Kalman filter estimates of the detected vehicle. Each vehicle may be modeled with a fixed 2 m uncertainty in detection. An additional uncertainty per time step may be accumulated forward in time following a quadratic curve that may be fit to data collected from errors in the forward velocity assumption targeting a margin of six standard deviations. This allows the prediction algorithm 152 to make allowances for some accelerations and braking of the traffic vehicles. The vehicle 102 (interchangeably referred to herein as the "ego car") has similar forward predictions of its behavior based on the target trajectory (i.e., of the high-level option) and acceleration profiles of potential low-level behaviors for completing the high-level option. The prediction errors are smaller for the vehicle 102, since the intentions are known in advance. At each time step, going forward in time until the vehicle 102 completes the intersection maneuver, the predicted position of the vehicle 102 may be compared against the predicted position of all traffic cars. If an overlap of the regions is detected, the action may be marked as likely to result in a collision.

The masking algorithm 250 may hide actions that are likely to result in a collision from the RL network 154. That is, the masking algorithm 250 may generate the restricted behaviors 260 based on the output of the prediction algorithm 152 to mask undesired actions from evaluation by the RL network 154. For example, the masking algorithm 250, for each time step, may supply the restricted behaviors 260 to the RL network 154 and/or policy 156 for evaluation. Actions that are marked as unlikely to result in a collision are passed on to the RL network 154 as restricted behaviors 260, which may be permissible actions that should result in no collision.

The RL network 154 may evaluate the restricted behaviors 260 based on the policy 156. Generally, the RL network 154 may select a low-level behavior from the restricted behaviors 260 or may wait for another low-level behavior to become available (e.g., not masked). If there are no restricted behaviors 260, or the RL network 154 chooses to wait, the vehicle 102 may wait at the intersection. Otherwise, the vehicle 102 may move forward with the selected acceleration of the selected low-level behavior until the vehicle 102 reaches a target speed.

In an aspect, the RL network 154 may be a reinforcement learning network trained to select a low-level behavior for performing a high-level option. For example, the RL network 154 may be a deep Q-learning network (DQNs) trained to learn policies 156 that optimize aspects of intersection handling on autonomous vehicles. Example optimizations include maximizing a margin (e.g., distance between vehicles) and minimizing disruption to other vehicles (e.g., total system braking) while navigating the intersection in the given time. The RL network 154 may use an optimization metric to determine a reward when successfully completing the high-level option and apply a penalty when failure occurs (e.g., not completing the high-level option during the given time). The prediction algorithm 152 may mask out low-level behaviors resulting in more severe consequences (e.g., collisions and near misses).

The RL network 154 may be trained with either simulations or real-world performance, or a combination of both. In an aspect, for example, the RL network 154 may be trained to select between four low-level behaviors for handling an intersection: wait and go with three levels of acceleration (e.g., 0.5, 1.0, and 1.5 m/s$^2$). Different low-level behaviors may be used for different high-level options. In an aspect, a different RL network 154 may be trained for each high-level option. As discussed above, the prediction algorithm 152 may mask out low-level behaviors that are likely to result in a collision for any time step.

During training, the RL network 154 may be rewarded based on whether the high-level option is completed. For example, when learning a network that seeks to minimize braking, the per trial reward may be +1 for successfully navigating the intersection with a −0.1 penalty applied for every time step a traffic vehicle is braking. Braking of traffic vehicles may be determined by detecting brake lights and/or detecting a change in velocity of the traffic vehicle. When learning a behavior that seeks to maximize the margin, the per trial reward may be a minimum actual distance, d, minus a threshold, times a weighting factor if successful. A penalty, z, may be applied if the vehicle does not complete the high-level option within the given time. The policy 156 may be a mapping of states to actions. The policy 156 may be learned by training the RL network 154.

Figure 3:
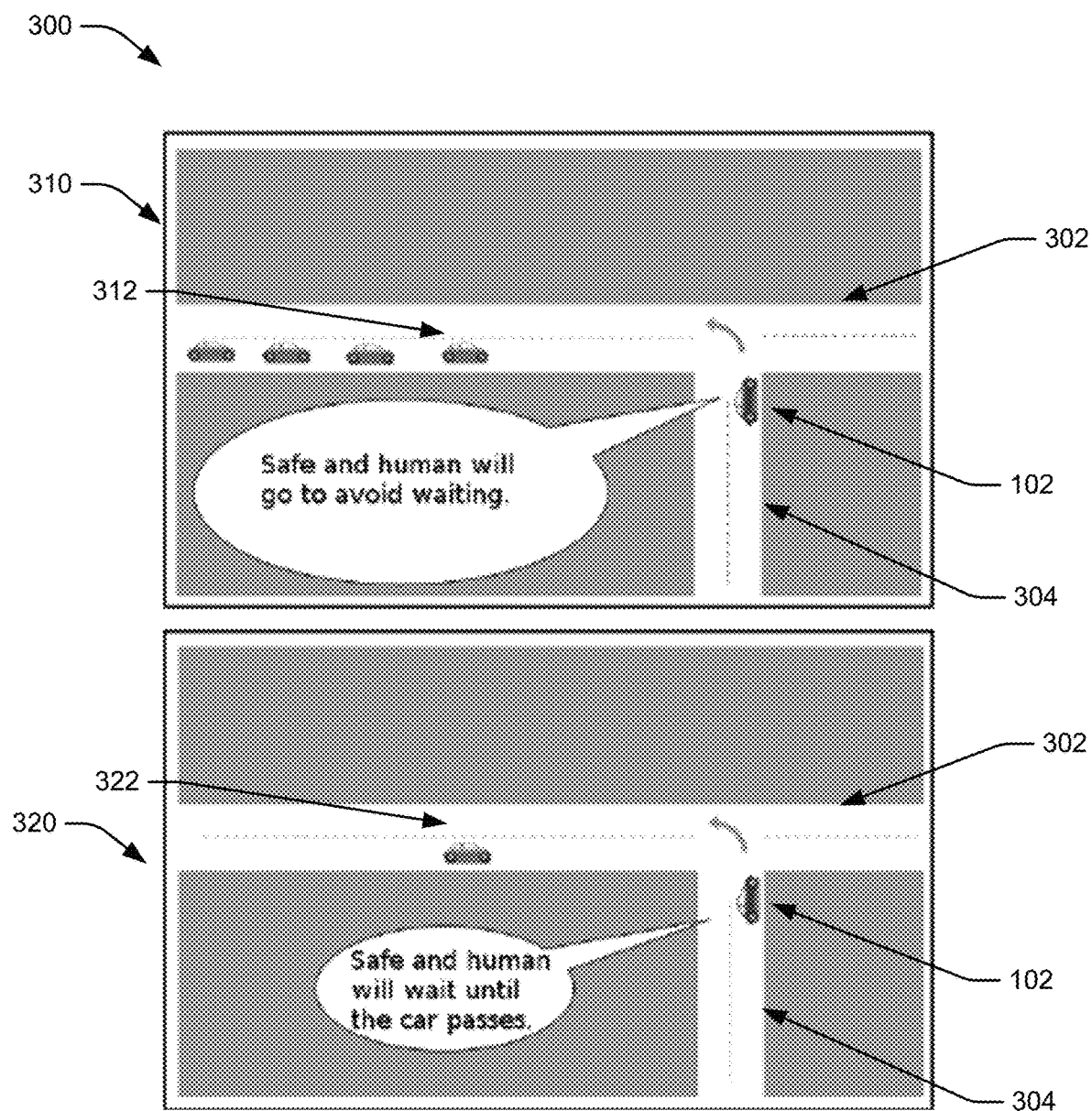
FIG. 3 illustrates an example decision scenario in accordance with aspects of the present disclosure.

FIG. 3 illustrates example decision scenarios at an intersection 300. At the intersection 300, the vehicle 102 may approach a road 302 along a transverse road 304. The vehicle 102 may select (e.g., based on navigation system 134) to make a left turn. The road 302 may be uncontrolled (i.e., the traffic vehicles on road 302 may have the right-of-way). The transverse road 304 may be controlled by a stop sign or may be uncontrolled.

In scenario 310, the vehicle 102 may detect multiple traffic vehicles 312 on road 302. A distance between the vehicle 102 may be sufficient for the vehicle 102 to make the left turn with a low likelihood of collision if a sufficient acceleration is used. The traffic vehicles 312, however, may react to the vehicle 102 by braking. A human driver may realize that the road 302 is busy and proceed with making the left turn using a relatively fast acceleration because the human driver may realize that another opportunity to make the left turn may not be available for considerable time.

In scenario 320, the vehicle 102 may detect a single traffic vehicle 322, which may be in the same position with the same velocity as the lead traffic vehicle 312. That is, the distance between the vehicle 102 may be sufficient for the vehicle 102 to make the left turn if a sufficient acceleration is used. A human driver, however, may realize that the road 302 is not busy, so the vehicle 102 may make the left turn after the traffic vehicle 322 passes without causing the traffic vehicle 322 to brake and allowing a greater distance between the vehicles. In an aspect, the RL network 154 may be trained to make similar decisions as the human driver, while actions that are more likely to result in a collision (e.g., making a slow left turn in front of the traffic vehicles 312) may be masked.

Figure 4:
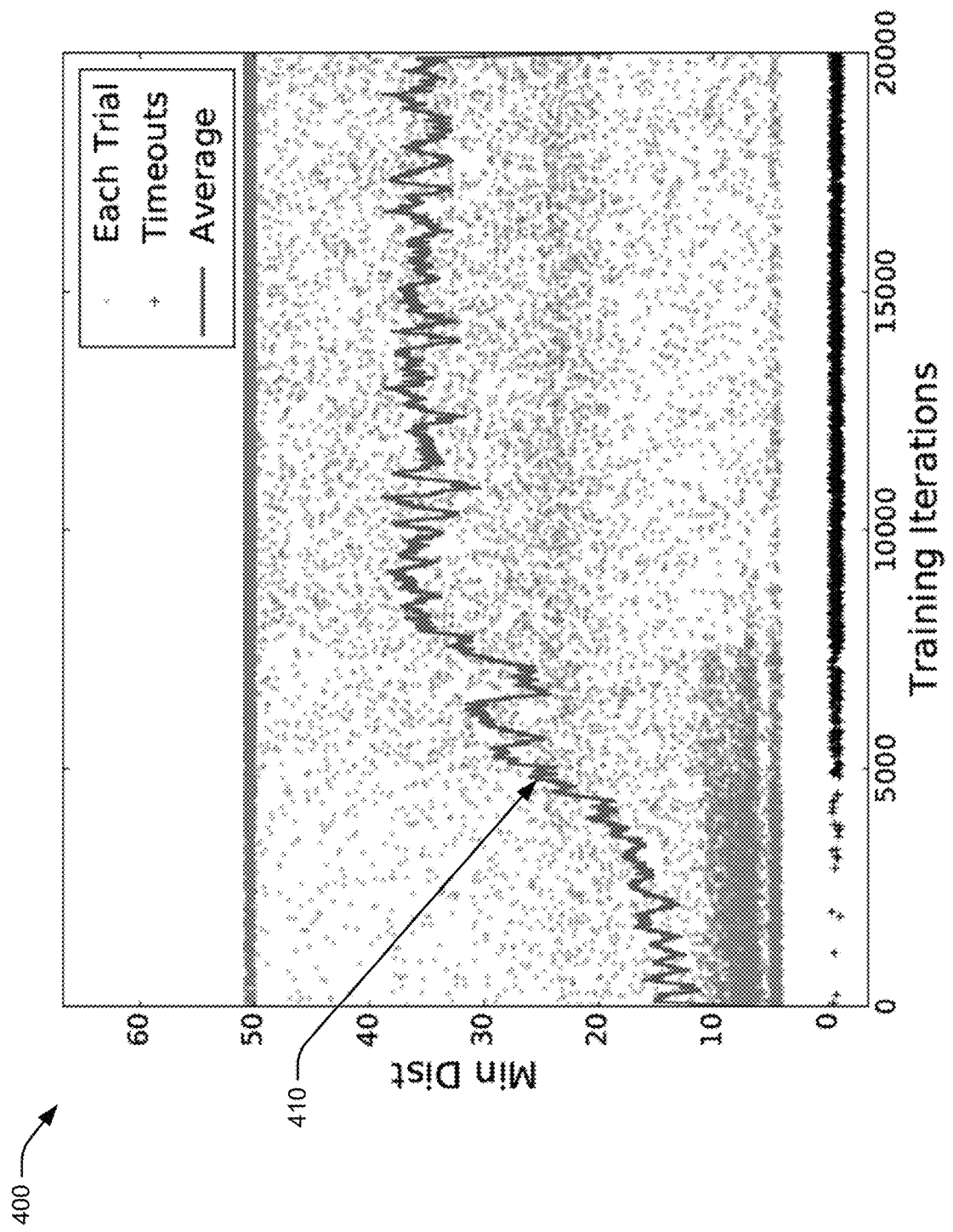
FIG. 4 is a chart showing example results of one model of the reinforcement learning system in accordance with aspects of the present disclosure.

FIG. 4 is a chart 400 showing example results of one model of the reinforcement learning system 150 using simulations and optimizing the minimum distance to traffic vehicles. The result of each trial is plotted with successful trials plotted as the minimum distance to a traffic vehicle and unsuccessful trials plotted below as a distance of −1 (merely for illustration, no collisions occur). An average distance line 410 showing the average over a sliding window of 200 trials is added. Several observations of the results demonstrate that the reinforcement learning system 150 may be able to affect the performance. Initially, fewer unsuccessful trials occur, but a large number of trials result in small minimum distances (e.g., less than 10 m). As the RL network 154 receives low rewards for small minimum distances, the RL network 154 chooses more often to wait, which results in more frequent failures, but also increases the average minimum distance between vehicles. The average minimum distance settles (around 35 m) as the RL network 154 finds an optimum balance between failures and maximizing the distance between vehicles. Different rewards or penalties may result in a different learning pattern. For example, increasing the penalty for a timeout should reduce the number of unsuccessful trials, but may reduce the average distance between vehicles.

Figure 5:
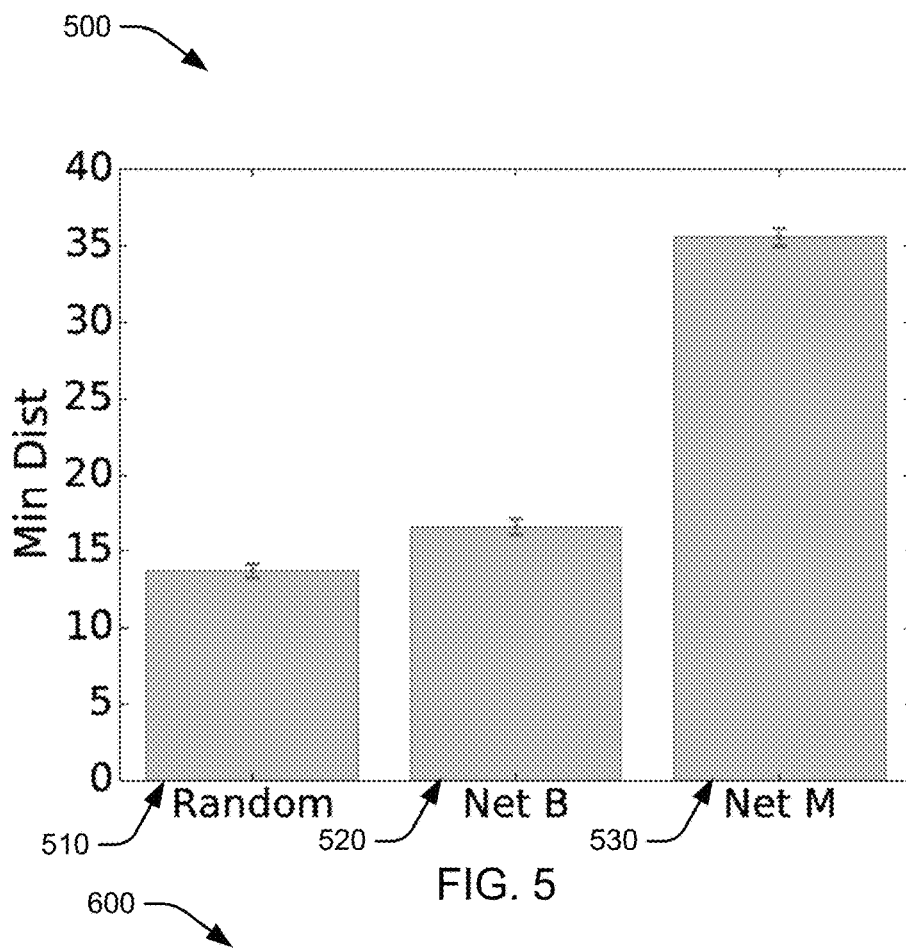
FIG. 5 is a chart showing example minimum distance results of different models of the reinforcement learning system in accordance with aspects of the present disclosure.

FIG. 5 is a chart 500 showing example minimum distance results of different training models applied to the RL network 154 of the reinforcement learning system 150. A random training 510 may have no reward based on minimum distance. The Net B 520 may be trained to minimize braking of traffic vehicles. The Net M 530 may be trained to maximize the minimum distance between vehicles. The Net B 520, trained to minimize braking, should leave a large margin when moving in front of a traffic vehicle, however, the vehicle 102 may come up very close behind a traffic vehicle. Accordingly, the Net B 520 may provide some improvement to minimum distance. In comparison, the Net M 530, trained to maximize the minimum distance, may produce a large increase to (more than doubling) the minimum distance.

Figure 6:
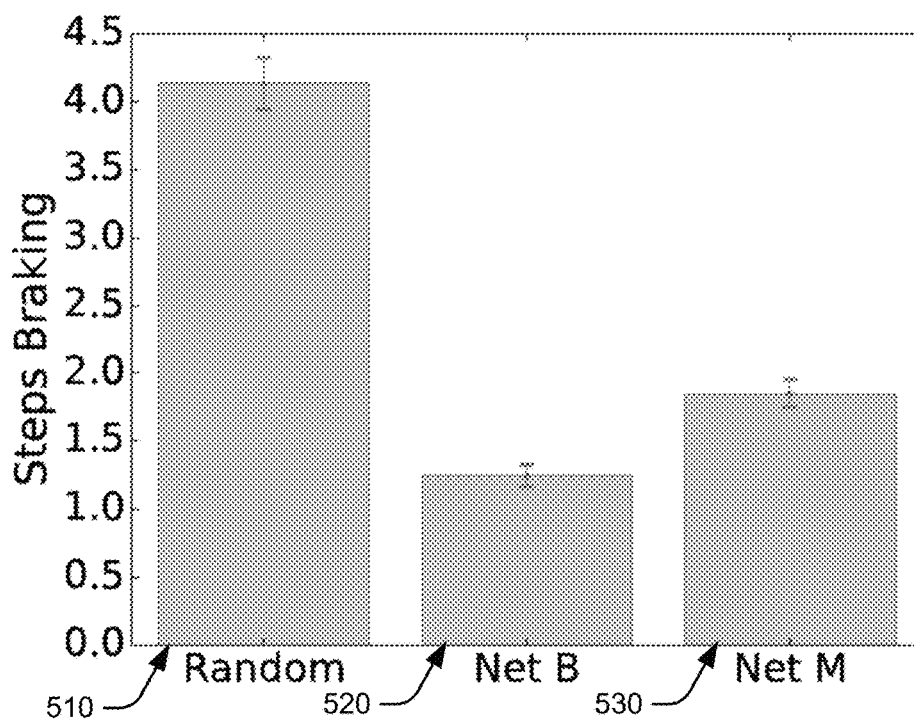
FIG. 6 is a chart showing example actor braking results of different models of the reinforcement learning system in accordance with aspects of the present disclosure.

FIG. 6 is a chart 600 showing example traffic vehicle braking results of the different training models applied to the RL network 154 of the reinforcement learning system 150. The same training models of random training 510, Net B 520, and Net M 530 are shown. The network that was trained to maximize distance should also reduce braking, assuming the traffic vehicle behavior does not change. Accordingly, Net M 530 may result in improved braking time compared to random training 510. The Net B 520, trained to minimize the braking of traffic vehicles, may produce a greater reduction of braking.

Figure 7:
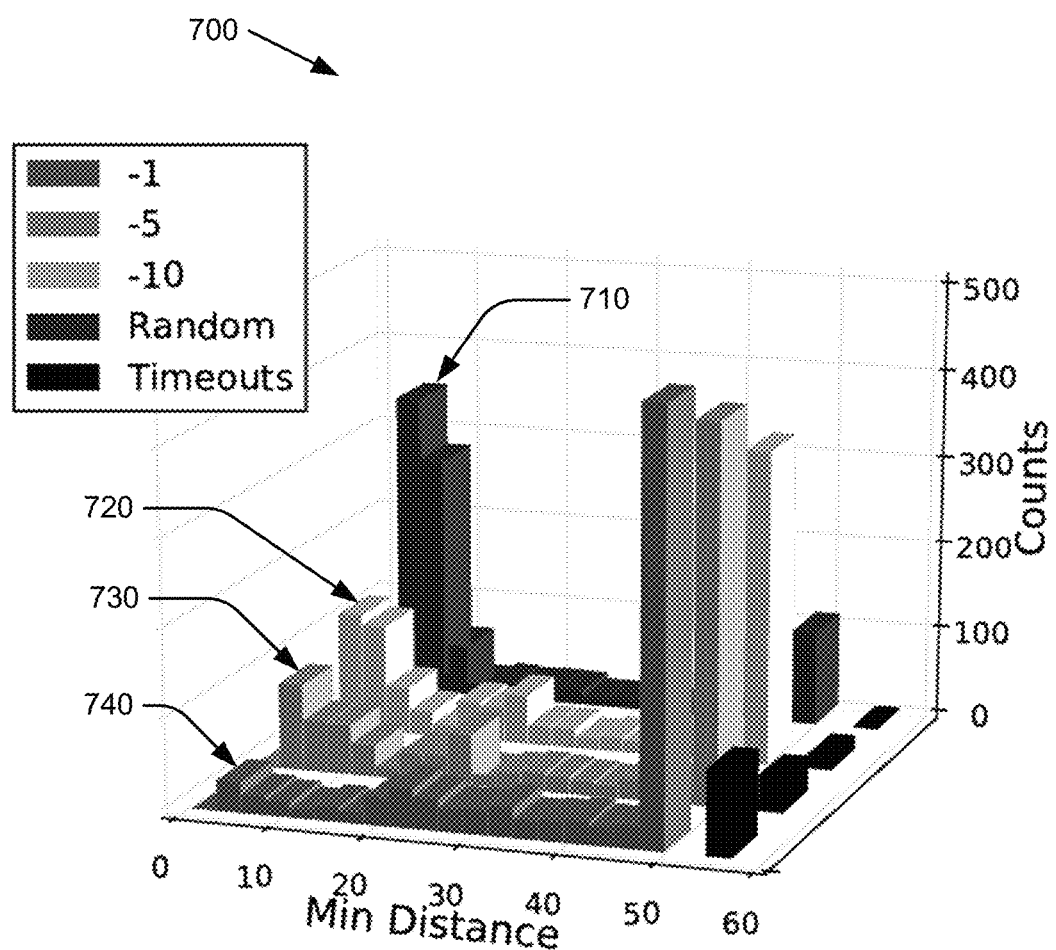
FIG. 7 is a chart showing example minimum distance results of different models of the reinforcement learning system using different penalties, in accordance with aspects of the present disclosure.

FIG. 7 is a chart 700 showing example minimum distance results of different models of the reinforcement learning system using different penalties. A process without training 710, where a random restricted behavior 260 is selected, may produce few timeouts, but may also produce a large number of trials with short minimum distances. Applying the RL network 154 to select a restricted behavior 260 may greatly reduce the number of trials with short minimum distances and increase the number of trials with longer minimum distances (i.e., greater than 50 m). Applying the RL network 154, however, may also increase the number of timeouts. Increasing the penalty for a timeout may reduce the number of trials resulting in a timeout, but also may also the number of trials with large minimum distances and may increase the number of trials with short minimum distances. Additionally, larger penalties may produce larger gradients (e.g., more extreme differences in minimum distance), which may have an adverse effect on the learning process. Accordingly, the improvement resulting from increasing the penalty for a timeout may be limited. In an aspect, simulation may be used to determine a model of rewards and penalties that results in a desirable distribution of an optimization metric. The vehicle 102 may be deployed into real driving scenarios to further learn behaviors for particular regions or even for particular intersections.

Figure 8:
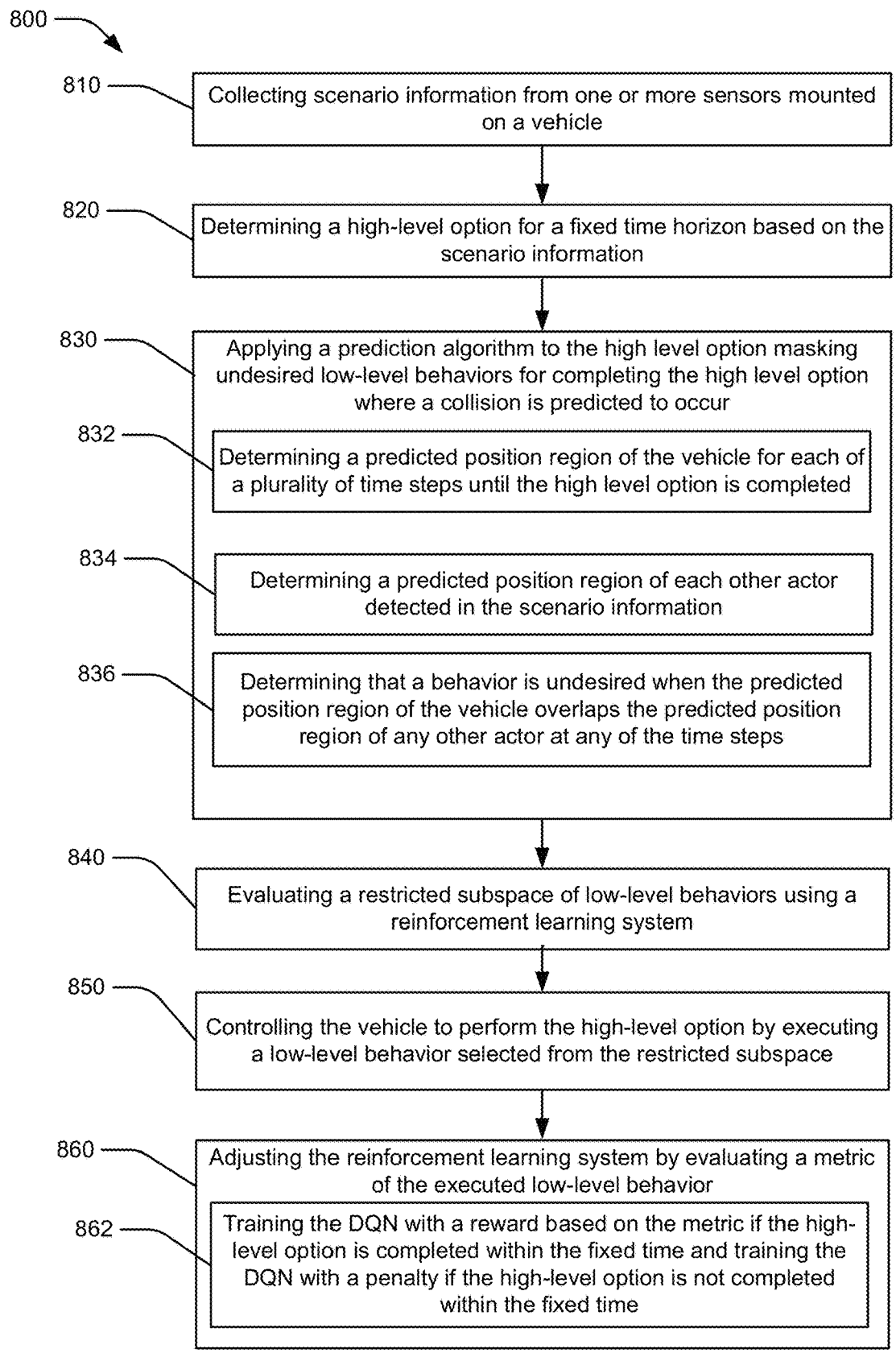
FIG. 8 illustrates a flowchart showing an example method of autonomous driving with behavior constraints and reinforcement learning, in accordance with aspects of the present disclosure.

FIG. 8 illustrates a flowchart showing an example method of autonomous driving with constraints and reinforcement learning, in accordance with aspects of the present disclosure. The method 800 may be performed by an autonomous driving system 110 including a reinforcement learning system 150 within a vehicle 102.

At block 810, the method 800 may include collecting scenario information from one or more sensors mounted on a vehicle. In an aspect, for example, the sensor system 140 may collect scenario information. The collection of scenario information may include processing raw input generated by the sensors to identify objects including other actors (e.g., traffic vehicles) and tracking the movement of the other actors.

At block 820, the method 800 may include determining a high-level option for a fixed time horizon based on the scenario information. In an aspect, the navigation system 134 may determine the high-level option for a fixed time horizon. For example, the high-level option may include making a turn, maintaining speed along a road, changing lanes, stopping at a traffic control device, or other typical driving options, which may include the legal options available to the vehicle 102. The navigation system 134 may select a high-level option based on a selected destination and route. In an aspect, the route may be optimized based on travel time, distance, or other costs. Additionally, determining the high-level option may include changing a route based on an obstacle. For example, if a broken-down vehicle is blocking the desired travel lane, the navigation system 134 may determine a high-level option to change lanes to avoid the broken-down vehicle.

At block 830, the method 800 may include applying a prediction algorithm to the high-level option to mask undesired low-level behaviors for completing the high-level option where a collision is predicted to occur. In an aspect, for example, the reinforcement learning system 150 may execute the prediction algorithm 152 to determine whether each of a plurality of low-level behaviors for completing the high-level option is an acceptable behavior. The reinforcement learning system 150 may also execute the masking algorithm 250 to mask the undesired low-level behaviors for completing the high-level option.

In an aspect, at block 832, the block 830 may include determining a predicted position region of the vehicle for each of a plurality of time steps until the high-level option is completed. For instance, the prediction algorithm 152 may determine the predicted position region of the vehicle 102 for each of a plurality of time steps until the high-level option is completed according to a tested low-level behavior. At block 834, the block 830 may include determining a predicted position region of each other actor detected in the scenario information. For instance, the prediction algorithm 152 may determine the predicted position region of each other actor detected in the scenario information. In an aspect, the prediction algorithm 152 may make predictions about the other actors by assuming a fixed base uncertainty and an increasing additional uncertainty per time step. For example, the prediction algorithm 152 may assume a fixed base uncertainty about a position of a traffic vehicle (e.g., 2 meters) and an increasing additional uncertainty (e.g., based on vehicle speed and variance). In an aspect, at block 836, the block 830 may include determining that a behavior is undesired when the predicted position region of the vehicle overlaps the predicted position region of any other actor at any of the time steps. For example, the prediction algorithm 152 may compare the predicted position region of the vehicle 102 to the predicted position region of each actor for each time step within the fixed time horizon. If the predicted position regions overlap, the prediction algorithm 152 may determine that a collision is predicted to occur and may determine that the low-level behavior is undesired. The masking algorithm 250 may then mask the undesired low-level behavior from the RL network 154.

At block 840, the method 800 may include evaluating a restricted subspace of low-level behaviors using a reinforcement learning system. In an aspect, the reinforcement learning system 150 may select from a set of restricted behaviors 260 using the RL network 154. In an aspect, for example, each of the restricted behaviors 260 may be evaluated by the trained RL network 154 for the scenario information to select the best behavior according to the training. In another aspect, the RL network 154 may generate the policy 156 that may be used to select a low-level behavior from the restricted behaviors 260 for the scenario information.

At block 850, the method 800 may include controlling the vehicle by executing a low-level behavior selected from the restricted subspace. In an aspect, for example, the autonomous driving system 110 may execute the driving control system 132 to control the vehicle 102 by executing the low-level behavior selected from the restricted behaviors 260. For example, the low-level behavior may define specific parameters to be provided to the driving control system 132 (e.g., acceleration, steering angle, braking pressure).

At block 860, the method 800 may include adjusting the reinforcement learning system by evaluating a metric of the executed low-level behavior. In an aspect, for example, the reinforcement learning system 150 may adjust the RL network 154 or the policy 156 by evaluating a metric of the executed low-level behavior. The sensor system 140 may determine the metric, for example, by measuring the minimum distance to other traffic vehicles or detecting braking of the other traffic vehicles. The RL network 154 may be trained based on the metric for the performed low-level behavior. For example, in block 862, the block 860 may include training the RL network 154 (which may be a DQN) with a reward based on the metric if the low-level behavior is completed within the fixed time and training the DQN with a penalty if the low-level behavior is not completed within the fixed time. The RL network 154 may adjust the policy 156 and/or generate a new policy 156 based on the training.

Figure 9:
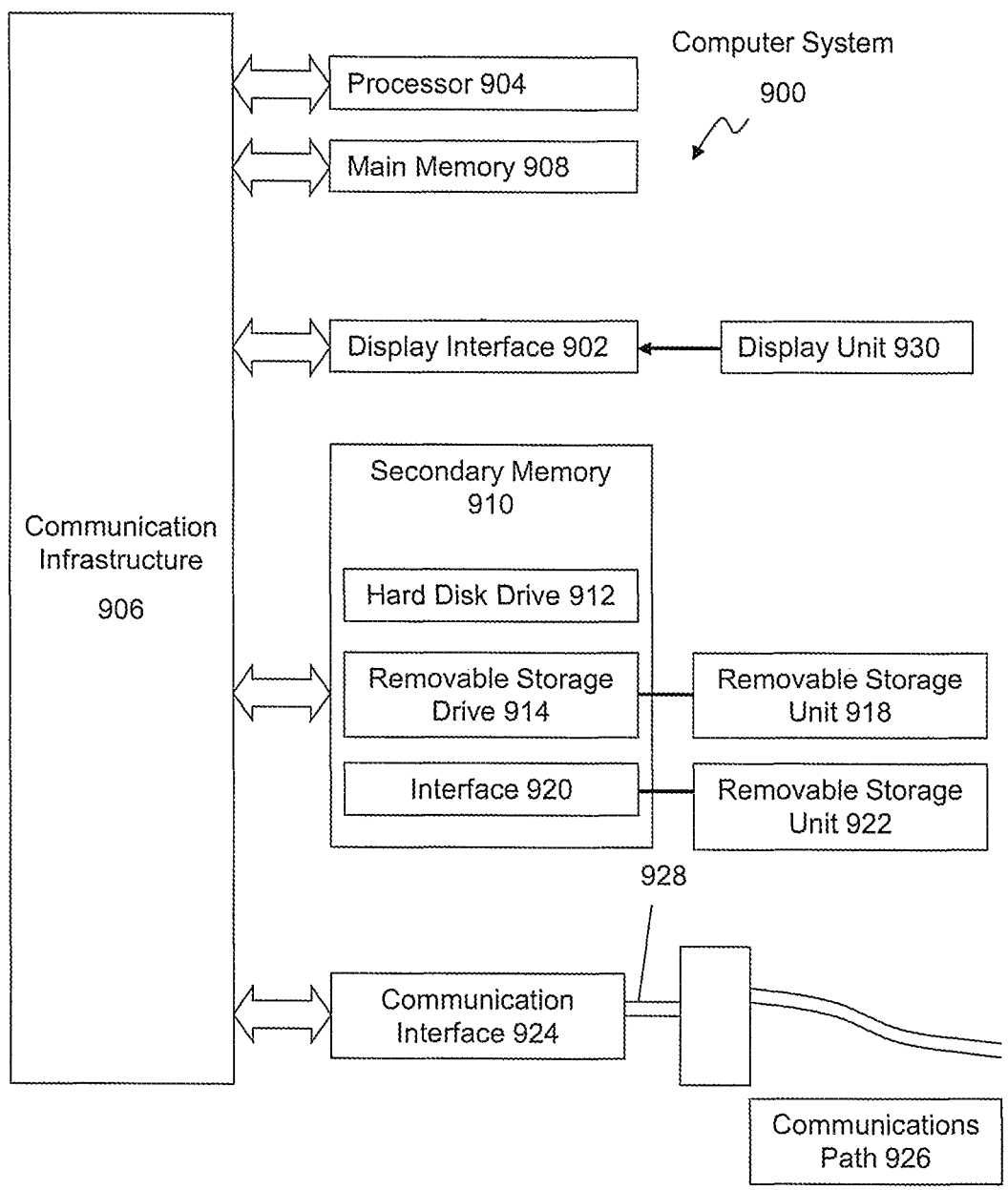
FIG. 9 presents an exemplary system diagram of various hardware components and other features, for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 9 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 900 is shown in FIG. 9.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 900 may include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. Aspects of the disclosure are directed to such computer program products.

Computer programs (also referred to as computer control logic) are stored in main memory 908 and/or secondary memory 910. Computer programs may also be received via communications interface 924. Such computer programs, when executed, enable the computer system 900 to perform various features in accordance with aspects of the present disclosure, as discussed herein. In particular, the computer programs, when executed, enable the processor 904 to perform such features. Accordingly, such computer programs represent controllers of the computer system 900.

In variations where aspects of the disclosure are implemented using software, the software may be stored in a computer program product and loaded into computer system 900 using removable storage drive 914, hard disk drive 912, or communications interface 920. The control logic (software), when executed by the processor 904, causes the processor 904 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 10:
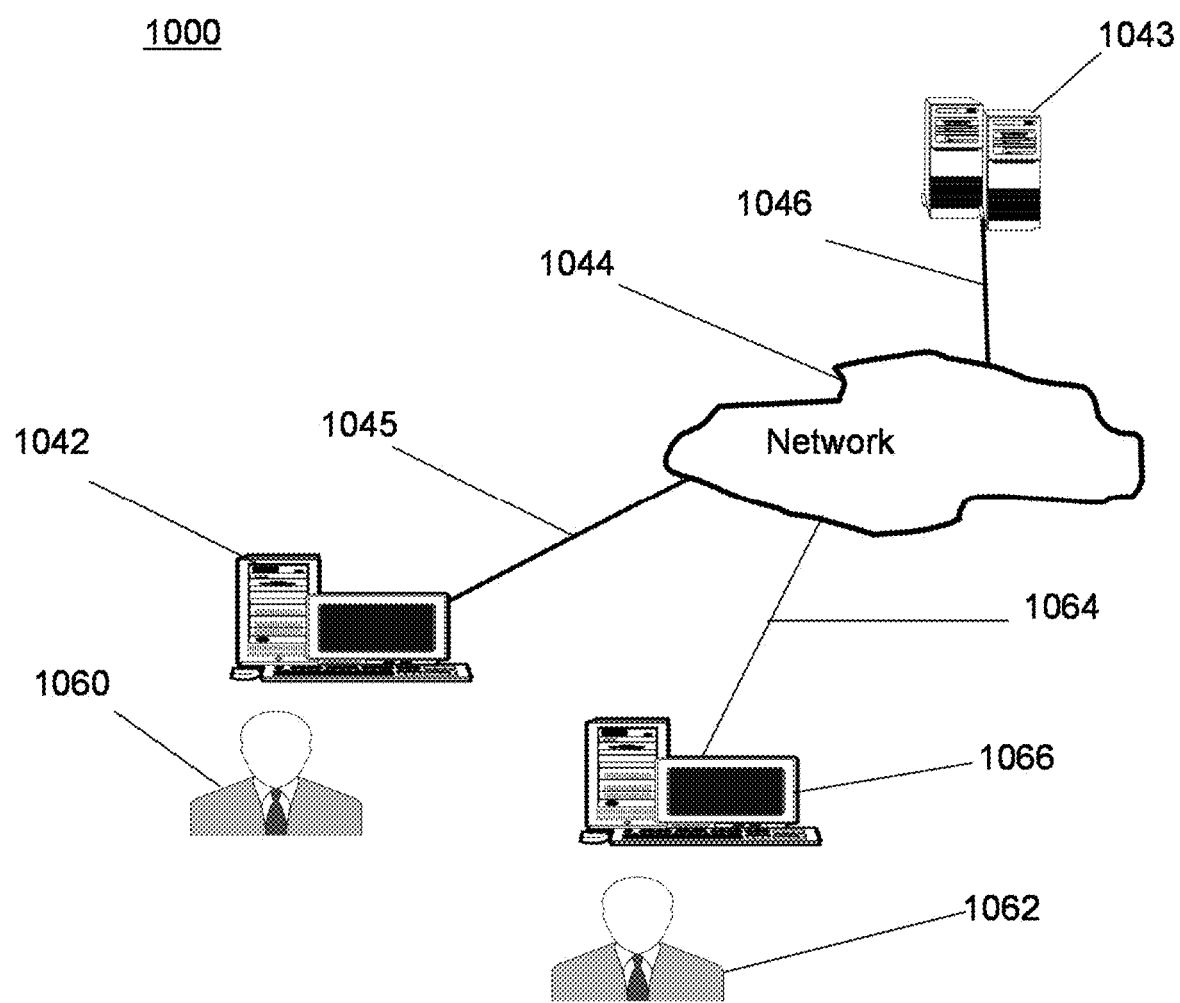
FIG. 10 is a block diagram of various exemplary system components, for use in accordance with aspects of the present disclosure.

FIG. 10 is a block diagram of various example system components that may be used in accordance with aspects of the present disclosure. For example, the various components may be within the vehicle 102, or only some of the components may be within the vehicle 102, and other components may be remote from the vehicle 102. The system 1000 includes one or more accessors 1060, 1062 (also referred to interchangeably herein as one or more "users") and one or more terminals 1042, 1066 (such terminals may be or include, for example, various features of the autonomous driving system 110). In one aspect, data for use in accordance with aspects of the present disclosure is, for example, input and/or accessed by accessors 1060, 1062 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method of controlling an autonomous vehicle, comprising:
   collecting scenario information from one or more sensors mounted on a vehicle;
   determining a high-level option for a fixed time horizon based on the scenario information;
   applying a prediction algorithm to the high-level option masking undesired low-level behaviors for completing the high-level option where a collision is predicted to occur to generate a restricted subspace of low-level behaviors, wherein applying the prediction algorithm comprises:
      determining a predicted position region of the vehicle for each of a plurality of time steps until the high-level option is completed wherein determining a predicted position region of the vehicle comprises assuming a fixed base uncertainty of the scenario information and an increasing additional uncertainty per time step;
      determining a predicted position region of each other actor detected in the scenario information; and
      determining that a behavior is undesired when the predicted position region of the vehicle overlaps the predicted position region of any other actor at any of the time steps;
   evaluating the restricted subspace of low-level behaviors using a reinforcement learning system, wherein evaluating the restricted subspace of low-level behaviors comprises training a deep Q-learning network (DQN);
   controlling the vehicle to perform the high-level option by executing a low-level behavior selected from the restricted subspace; and
   adjusting the reinforcement learning system by evaluating a metric of the executed low-level behavior, wherein adjusting the reinforcement learning system by evaluating the metric of the low-level behavior comprises training the DQN with a reward based on the metric if the high-level option is completed within the fixed time horizon and training the DQN with a penalty if the high-level option is not completed within the fixed time horizon, wherein the metric is an amount of braking by other actors detected in the scenario information.

2. The method of claim 1, wherein the DQN is configured with outputs corresponding to each of a plurality of low-level behaviors, each low-level behavior including vehicle control parameters for performing the high-level option.

3. The method of claim 1, wherein evaluating the restricted subspace of low-level behaviors using the reinforcement learning system provides an output of an acceleration rate for performing the high-level option.

4. The method of claim 1, wherein evaluating the restricted subspace of low-level behaviors comprises evaluating the restricted subspace using a policy generated by the reinforcement learning system and wherein adjusting the reinforcement learning system comprises adjusting the policy.

5. The method of claim 1, further comprising determining the amount of braking by other actors based on detection of brake lights.

6. The method of claim 1, further comprising determining the amount of braking by other actors based on a change in velocity of each of the other actors.

7. A vehicle for autonomous driving, comprising:
   a sensor system including one or more sensors mounted on the vehicle that collects scenario information;
   a memory storing executable instructions; and
   a processor communicatively coupled to the memory and configured to:
   determine a high-level option for a fixed time horizon based on the scenario information;
   apply a prediction algorithm to the high-level option to mask undesired low-level behaviors for completing the high-level option where a collision is predicted to occur to generate a restricted subspace of low-level behaviors, wherein to apply the prediction algorithm, the processor is configured to:
      assume a fixed base uncertainty of the scenario information and an increasing additional uncertainty per time step to determine a predicted position region of the vehicle for each of a plurality of time steps until the high-level option is completed;
      determine a predicted position region of each other actor detected in the scenario information; and
      determine that a behavior is undesired when the predicted position region of the vehicle overlaps the predicted position region of any other actor at any of the time steps;
   evaluate the restricted subspace of low-level behaviors using a reinforcement learning system, wherein the processor is configured to train a deep Q-learning network (DQN) to evaluate the restricted subspace of low-level behaviors;
   control the vehicle to perform the high-level option by executing a low-level behavior selected from the restricted subspace; and
   adjust the reinforcement learning system by evaluating a metric of the executed low-level behavior, wherein the processor is configured to train the DQN with a reward based on the metric if the high-level option is completed within the fixed time horizon and training the DQN with a penalty if the high-level option is not completed within the fixed time horizon, wherein the metric is an amount of braking by other actors detected in the scenario information.

8. The vehicle of claim 7, wherein the DQN is configured with outputs corresponding to each of a plurality of low-level behaviors, each low-level behavior including vehicle control parameters for performing the high-level option.

9. The vehicle of claim 7, wherein the processor is configured to determine the amount of braking by other actors based on detection of brake lights.

10. The vehicle of claim 7, wherein the processor is configured to determine the amount of braking by other actors based on a change in velocity of each of the other actors.

11. A non-transitory computer-readable medium storing computer executable code for autonomously controlling a vehicle, comprising code to:
  collect scenario information from one or more sensors mounted on a vehicle;
  determine a high-level option for a fixed time horizon based on the scenario information;
  apply a prediction algorithm to the high-level option to mask undesired low-level behaviors for completing the high-level option where a collision is predicted to occur to generate a restricted subspace of low-level behaviors, wherein the code to apply a prediction algorithm to the high-level option to mask undesired low-level behaviors comprises code to:
    assume a fixed base uncertainty of the scenario information and an increasing additional uncertainty per time step to determine a predicted position region of the vehicle for each of a plurality of time steps until the high-level option is completed;
    determine a predicted position region of each other actor detected in the scenario information; and
    determine that a behavior is undesired when the predicted position region of the vehicle overlaps the predicted position region of any other actor at any of the time steps;
  evaluate the restricted subspace of low-level behaviors using a reinforcement learning system, wherein evaluating the restricted subspace of low-level behaviors comprises training a deep Q-learning network (DQN);
  control the vehicle to perform the high-level option by executing a low-level behavior selected from the restricted subspace; and
  adjust the reinforcement learning system by evaluating a metric of the executed low-level behavior, wherein adjusting the reinforcement learning system by evaluating a metric of the low-level behavior comprises training the DQN with a reward based on the metric if the high-level option is completed within the fixed time horizon and training the DQN with a penalty if the high-level option is not completed within the fixed time horizon, wherein the metric is an amount of braking by other actors detected in the scenario information.

12. The non-transitory computer-readable medium of claim 11, further comprising code to determine the amount of braking by other actors based on detection of brake lights.

13. The non-transitory computer-readable medium of claim 11, further comprising code to determine the amount of braking by other actors based on a change in velocity of each of the other actors.

* * * * *